April 15, 1969 J. J. GIBSON 3,439,185

LOGIC CIRCUITS EMPLOYING FIELD-EFFECT TRANSISTORS

Filed Jan. 11, 1966 Sheet 1 of 2

INVENTOR.
J. JAMES GIBSON
BY
Samuel Cohen
Attorney

INVENTOR.
J. JAMES GIBSON
BY
Samuel Cohen
Attorney

United States Patent Office 3,439,185

Patented Apr. 15, 1969

3,439,185

LOGIC CIRCUITS EMPLOYING FIELD-EFFECT TRANSISTORS

John James Gibson, Princeton, N.J., assignor to Radio Corporation of America, a corporation of Delaware Filed Jan. 11, 1966, Ser. No. 519,942
Int. Cl. H03k 19/08
U.S. Cl. 307—205 8 Claims

ABSTRACT OF THE DISCLOSURE

Field-effect transistors arranged in a bridge, one arm of which is capable of conducting current in either direction. These bridge circuits are useful as flip-flops, NOR gates and other logic circuits.

An object of the invention is to provide logic circuits which employ field-effect transistors.

Another object of the invention is to provide logic circuits which are versatile in the sense that they can be made to implement a number of different logic functions in respone to different combinations of control voltages applied to the logic circuits.

Another object of the invention is to provide logic circuits which are particularly useful in content-addressed memory systems—for example, as the storage or memory cells in such systems.

Briefly stated, the present invention comprises a network of field-effect transistors arranged in a bridge, the arms of which comprise the source-to-drain paths of the transistors. One terminal of the bridge is connected to a source of operating voltage corresponding to a binary digit of one value and another terminal of the bridge is connected to a source of reference voltage corresponding to the binary digit of other value. By selectively causing the source-to-drain paths of the transistors to act as low values of impedance, a point on the bridge at which an output may be obtained may be made to represent the binary digit of either value. One arm of the bridge extending between third and fourth terminals in the bridge comprises the source-to-drain path of a field-effect transistor which, in response to an enabling voltage applied thereto, conducts in a direction dependent upon the conducting states of the other transistors.

The invention is discussed in greater detail below and is shown in the following drawings of which:

The transistors employed in the present invention are majority carrier devices of the type known in the art as insulated-gate field-effect transistors. The body of such a device is made of a semiconductor material and a carrier conduction channel within the body is bounded at one end by a source region and at the other end by a drain region. A control electrode, known in this art as a "gate electrode," lies over at least a portion of the carrier conduction channel and is separated therefrom by a region of insulating material. Signals or voltages applied to the gate electrode control, by field-effect, the conductance of the channel.

Two types of insulated-gate field-effect transistors which have been widely publicized in recent years are the "thin-film" transistor (TFT) and the "metal oxide semiconductor" transistor (MOS). The former are discussed, for example, in an article: "The TFT—A New Thin-Film Transistor," by P. K. Weimer appearing at pages 1462–1469 of the June 1962, issue of the Proceedings of the IRE, and the latter in an article: "The Silicon Insulated-Gate Field-Effect Transistor," by S. R. Hofstein and F. P. Heiman, appearing at pages 1190–1202 of the September 1963, issue of the Proceedings of the IEEE.

Field-effect transistors may be of the enhancement or of the depletion type. The enhancement device is of particular interest in the present application. In such devices, the impedance of the conduction channel is high when the gate and source electrodes are at the same voltage. A signal of the proper polarity applied between the gate and source electrodes decreases the impedance of the conduction channel. In a depletion device, the impedance of the conduction path is relatively low when the source and gate are at the same voltage. Input signals of the proper polarity applied between the source and drain electrodes increase the impedance of the conduction path.

An insulated-gate field-effect transistor may be of P-type or N-type, depending upon the material of which the semiconductor body is made. A P-type unit is one in which the majority carriers are holes; whereas, an N-type unit is one in which the majority carriers are electrons. The logic circuits of the present application employ both types of devices and these devices may be, for example, MOS transistors.

Figures 1, 2, 4:
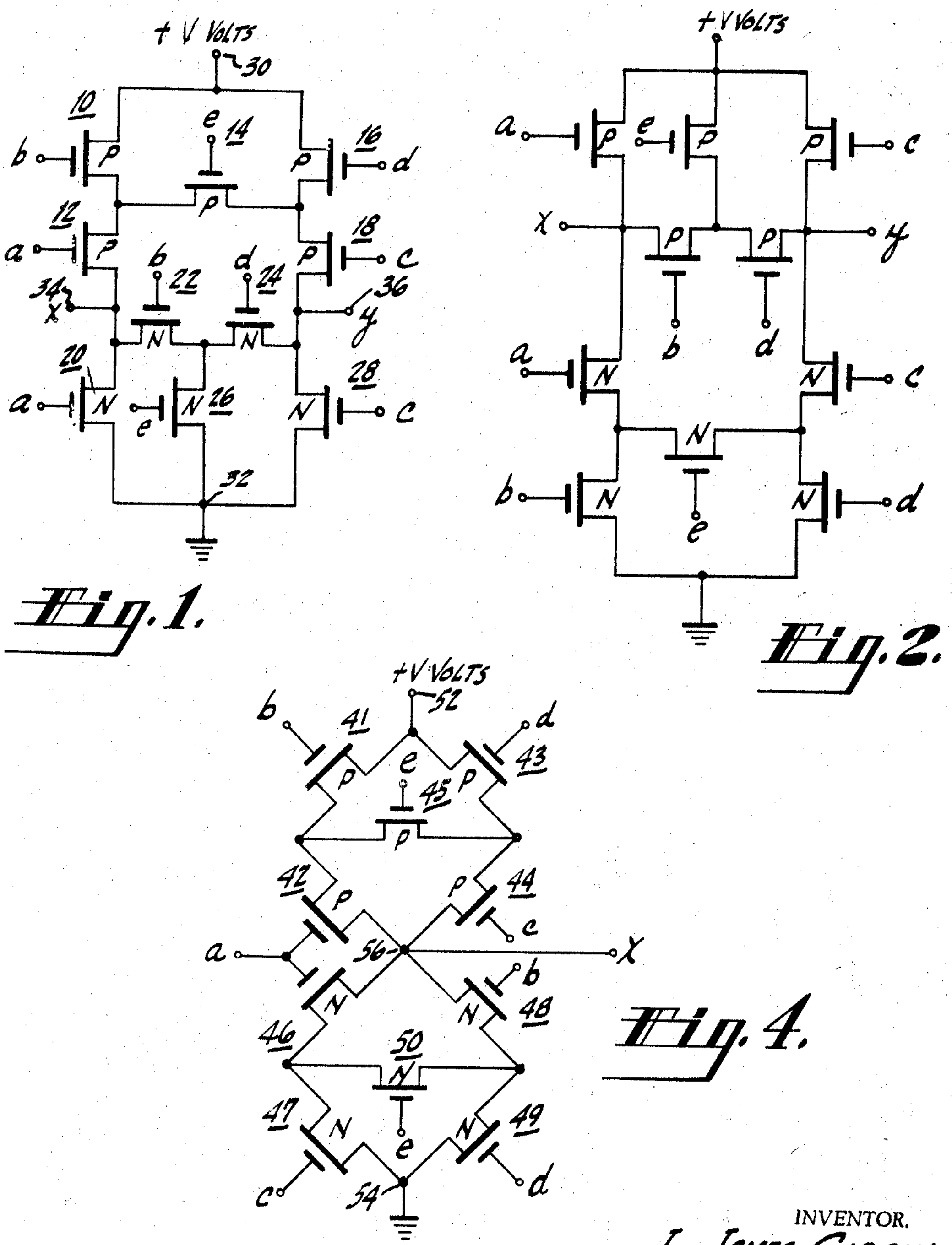
FIGURE 1 is a schematic circuit diagram of one embodiment of the present invention.
FIGURE 2 is a schematic circuit diagram of another embodiment of the invention.
FIGURE 4 is a schematic circuit diagram of a third form of the present invention.

The logic circuit shown in FIGURE 1 includes ten field-effect transistors arranged in a bridge network. Five of the transistors 10, 12, 14, 16 and 18 are of P-type and the remaining five transistors 20, 22, 24, 26 and 28 are N-type. One terminal 30 of the bridge is connected to a source of operating voltage +V and the other terminal 32 of the bridge is connected to a point of reference voltage, shown as ground. An output $x$ is available at terminal 34 of the bridge and an output $y$ is available at terminal 36 of the bridge. The input information or control voltages $a$, $b$, $c$, $d$ and $e$ are applied to the gate electrodes of the transistors, as shown. It may be observed that each input is applied both to a P-type and an N-type transistor. For example, the input $a$ is applied to P-type transistor 12 and N-type transistor 20; the input $b$ is applied to P-type transistor 10 and N-type transistor 22, and so on.

As mentioned in the introductory portion of the application, the transistors of FIGURE 1 are of the enhancement type. In other words, if a voltage +V is applied to the gate electrode of an N-type transistor, such as 20, it causes the source-to-drain path of that transistor to exhibit a low impedance and if the gate electrode of transistor 20 is at ground potential, the same potential as at its source electrode, transistor 20 exhibits a high impedance. On the other hand, if the gate electrode of a P-type transistor, such as 10, is placed at ground potential, the source-to-drain path of that transistor exhibits a low impedance since its source is at +V volts, and if the gate electrode of transistor 10 is placed at +V volts, the drain-to-source path of the transistor exhibits a high impedance.

It is convenient to discuss the operation of the circuit of FIGURE 1 and of the other circuits in Boolean terms. The convention arbitrarily adopted is that +V volts represents the binary digit (bit) 1 and ground represents the bit 0. To further simplify the explanation of the circuit operation, in the discussion which follows it is sometimes stated that a 1 or a 0 is applied to a circuit or obtained from a circuit rather than stating that a voltage which is indicative of a 1 or 0 is applied to or derived from a circuit.

In the operation of the circuit of FIGURE 1, if $a=1$, the source-to-drain path of transistor 20 exhibits a low impedance and $x$ assumes the value of the voltage at terminal 32, namely ground. In other words, when $a=1$, $x$ becomes 0. The bit $a$ is also applied to transistor 12 and when $a$ has the value 1, the source-to-drain path of transistor 12 is a high impedance. Thus, when $a$ is 1, transistor 12 isolates terminal 34 from terminal 30.

If $b=1$ and $e=1$, the source-to-drain paths of transistors 22 and 26 both are low impedances and $x$ becomes 0. Under this same set of conditions, the source-to-drain paths of transistors 10 and 14 are high impedances and isolate the $x$ terminal 34 from the operating voltage source +V at terminal 30. Continuing further with this analysis, it can be shown that $x$ is connected to ground either when $a$ is 1 or when $b$ and $e$ are 1 or when $b$, $d$ and $c$ are 1. In Boolean terms $x=0$ when $$a+be+bdc=1 \qquad (1)$$

Under all of these conditions, there should be an open circuit between $x$ and terminal 30. In Boolean terms, the following conditions must be met $$a+be+bd=1 \qquad (1a)$$

independently of $c$.

If $a=e=c=0$, while $b=d=1$, point $x$ will be connected to point $y$ via two conducting paths; one via N-type transistors 22 and 24 and the other via P-type transistors 12, 14 and 18. However, neither point $x$ nor point $y$ is connected to terminal 30 or 32. Therefore, the value of the outputs $x$ and $y$ would be indeterminite under this set of conditions. It is for this reason that in the logic circuit of FIGURE 1 this one of the 32 possible input conditions is not permitted. In equation form, the input state $a=e=c=0$; $b=d=1$ is not permitted and in Boolean form the condition $\bar{a}.\bar{e}.\bar{c}.b.d=1$ is the only input state which is not permissible.

From the discussion above, it can be seen that the circuit of FIGURE 1 implements the logic functions $$\bar{x}=a+be+bdc \qquad (2)$$

and $$\bar{y}=c+de+bda \qquad (3)$$

Expressed in another form $$x=\overline{a+be+bcd} \qquad (4)$$

and $$y=\overline{c+de+bda} \qquad (5)$$

all provided that the input state $\overline{eecbd}=1$ is not permitted.

The circuit of FIGURE 1 has many uses, a number of which are discussed below. In the first use, the convention is adopted that $bd=0$, that is, $b$ and $d$ are never 1 at the same time. Under this set of conditions, the third term in Equation 4 becomes 0 as does the third term in Equation 5 and these equations reduce to $$x=\overline{a+be} \qquad (6)$$

and $$y=\overline{c+de}. \qquad (7)$$

If terminal $y$ in FIGURE 1 is connected to terminals $a$, then Equation 6 becomes $$x=\overline{y+be}. \qquad (8)$$

If terminal $x$ is connected to terminals $c$, Equation 7 becomes $$y=\overline{x+de}. \qquad (9)$$

Now, let $D_a=b$, $D_b=d$ and $W=e$. Equations 8 and 9 above become:

$$x=\overline{y+D_aW} \qquad (10)$$

and $$y=\overline{x+D_bW} \qquad (11)$$

These equations describe a circuit which is useful as a content-addressed memory cell. The letter W represents a write command. The letter $x$ represents a stored bit. The letter $y$ is the complement of $x$. $D_a$ and $D_b$, together, represent the information it is desired to write into the memory cell.

When $W=0$ it is desired that no information be written into the cell. When $W=1$ then information can be written into the cell. When $D_a=1$ and $D_b=0$ (and $W=1$) it is desired that a 1 be written into a memory cell. A 1 is defined as $y=1$, $x=0$. When $D_a=0$ and $D_b=1$ (and $W=1$) then it is desired that a 0 be written into a memory cell. A stored 0 is defined as $y=0$, $x=1$. When $D_a=0$ and $D_b=0$, it is desired that the information stored remain unaffected. This is known as a "don't care" or ∅ condition. The input $D_aD_b=1$ is not permitted.

The truth table below describes the operations discussed above.

TABLE

| Command | W | $D_a$ | $D_b$ | x | y |
|---|---|---|---|---|---|
| Don't write | 0 | ∅ | ∅ | x | y |
| Write 1 | 1 | 1 | 0 | 0 | 1 |
| Write 0 | 1 | 0 | 1 | 1 | 0 |
| Retain same state | 1 | 0 | 0 | x | y |

Legend: ∅=Don't care. $D_a=D_b=1$ is not permitted.

It can be seen from Equations 10 and 11 above that the circuit connected as described does operate in the manner shown in the truth table. For example, when $W=1$ and $D_a$ and $D_b$ are both 0, then $x=y$ and $y=x$. The stored information, in other words, is unaffected. As another example, when $W=1$, $D_a=1$ and $D_b=0$, then $x=\overline{y+1}=0$. $y=\overline{0+0.1}=1$.

A 2 x 2 array of the write portion of a content-addressed memory, where each memory cell is connected in the manner discussed above, is shown in FIGURE 3. It is to be appreciated, of course, that in practice there may be many more columns and rows than are shown. However, two columns and two rows are adequate for illustration.

The memory cell in row 1 and column 1, namely 1–1 is shown in schematic form. The three remaining memory cells are identical to cell 1–1 and therefore are shown only in block form. To aid the reader to follow the circuit operation, elements in FIGURE 3 which correspond in structure and function to elements in FIGURE 1, have the same reference numerals and characters applied.

Figure 3:
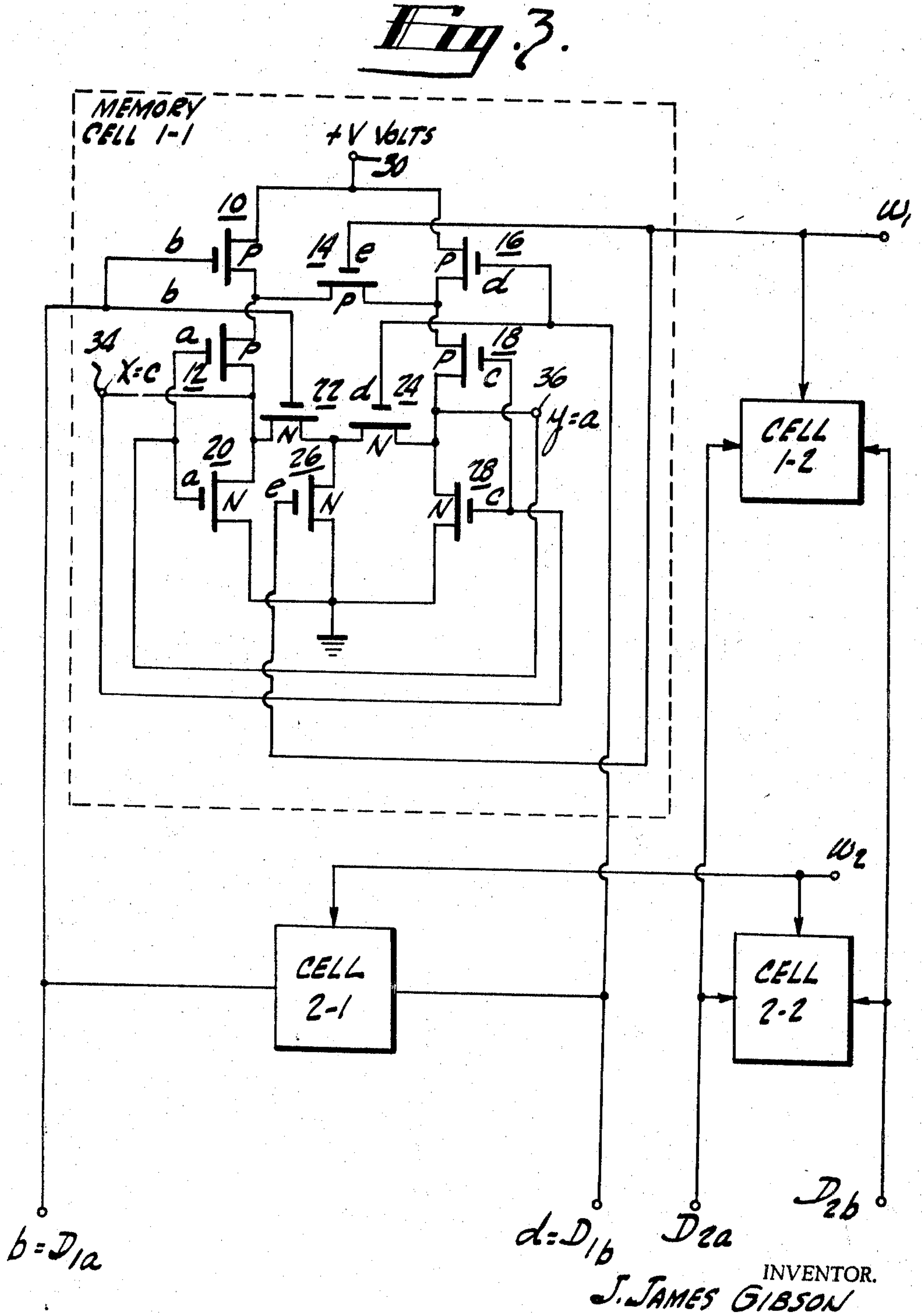
FIGURE 3 is a block and schematic circuit diagram of a 2 x 2 array of memory cells, each cell comprising the circuit of FIGURE 1.

In the operation of the memory cell of FIGURE 3, if at the time $W_1$ is 1, $D_{1a}$ is 1 and $D_{1b}$ is 0, a 1 will be written into memory cell 1–1. The $W_1=1$ bit makes the source-to-drain path of transistor 26 assume a low value of impedance. The bit $D_{1a}=1$ makes the source-to-drain path of transistor 22 assume a low value of impedance. As these paths of transistors 22 and 26 connect terminal 34 to ground, $x$ becomes 0. $x=0$ applied to the gate electrode of transistor 18 makes its source-to-drain path exhibit a low impedance. $D_{1b}=0$ applied to the gate electrode of transistor 16 makes its source-to-drain path exhibit a low impedance. Accordingly, terminal 36 assumes the value of voltage +V, that is, $y$ becomes 1.

If $W_1=1$, $D_{1a}=0$ and $D_{1b}=1$, then the memory cell 1–1 is made to store a 0. $W_1=1$ applied to the gate electrode of transistor 26 causes its source-to-drain path to exhibit a low impedance. $D_{1b}=1$ applied to the gate electrode of transistor 24 causes its source-to-drain path to exhibit a low impedance. These two transistors therefore connect terminal 36 to ground via a low impedance, making $y=0$. $y=0$ applied to the gate electrode of transistor 12 causes its source-to-drain path to exhibit a low value of impedance. $D_{1a}=0$ applied to the gate electrode of transistor 10 causes its source-to-drain path to exhibit a low value of impedance. These two paths therefore connect terminal 34 to +V, via a low impedance, and $x$ becomes 1.

If $W_1=0$, it can be seen, by inspection, that the information stored cannot be changed by the permitted values of $D_{1a}$ and $D_{1b}$.

In the operation of the memory system shown in FIGURE 3, it is to be understood that when a write voltage, such as $W_1$, is applied to a row, all of the memory cells in that row can be supplied with information. During this interval, for example, a bit of desired value may be written into memory cell 1–1 by applying appropriate voltages $D_{1a}$ and $D_{1b}$ and a bit of desired value can be written into memory cell 1–2 by applying appropriate voltages $D_{2a}$ and $D_{2b}$. It is believed not to be necessary, for purposes of the present application, to discuss in greater detail other aspects of content-addressed memories. However, such details may be found in copending application Ser. No. 506,245, filed Nov. 3, 1965 by J. R. Burns and assigned to the same assignee as the present invention.

Another use for the circuit of FIGURE 1 is as two independent NOR circuits. In this use, $c$ and $e$ are never permitted to be 0 simultaneously, that is, $\overline{ce}=0$. Repeating Equations 4 and 5 which are still valid for this case, $$x=\overline{a+\bar{b}e+\bar{b}cd} \quad (4)$$

$$y=\overline{c+de+\bar{b}da} \quad (5)$$

Suppose now that $e$ is made equal to 1. Then Equations 4 and 5 reduce to $$x=\overline{a+\bar{b}+\bar{b}cd} \quad (4a)$$

$$y=\overline{c+d+\bar{b}da} \quad (5a)$$

If the further restraint is added to the circuit that $bd=0$ then Equations $4a$ and $5a$ become:

$$x=\overline{a+\bar{b}}=\bar{a}\cdot\bar{b} \quad (12)$$

$$y=\overline{c+d}=\bar{c}\cdot\bar{d} \quad (13)$$

These are the equations for two independent NOR circuits.

Returning to Equations 4 and 5, suppose $e=0$ and $c=1$: These equations become $$x=\overline{a+\bar{b}d} \quad (14)$$

$$y=\overline{1+\bar{b}da}=0 \quad (15)$$

If $b$ is also 1, Equation 14 becomes $$x=\overline{a+d}=\bar{a}\cdot\bar{d} \quad (16)$$

Returning again to Equations 4 and 5, if $e=1$, $c=0$, and $b=1$, then:

$$x=\overline{a+\bar{1}+\bar{0}}=0 \quad (17)$$

$$y=\overline{d+\bar{d}a}=\bar{d} \quad (18)$$

As a third set of conditions, if $e=1$, $c=1$ and $b=0$, then $$x=\bar{a} \quad (19)$$

$$y=0 \quad (20)$$

The various circuits described above are useful in content-addressed memory and other logic circuit applications. For example, Equation 19 describes a logical inverter, Equation 16 a NOR circuit for inputs $a$ and $d$, and so on. An important feature of the circuit of FIGURES 1 and 3 (this feature is also present in the circuit of FIGURES 2 and 4) is that under some conditions transistor 14 conducts in one direction and under other conditions, it conducts in the other direction. Thus, for example, if $a=e=d=0$ (and $b=c=1$) conventional current flows in the direction from terminal 30 through transistors 16, 14 and 12 to terminal 34. If $b=e=c=0$, (and $a=d=1$) conventional current flows from terminal 30 through transistors 10, 14 and 18 to terminal 36. The direction of current flow through transistor 14 under this set of conditions is opposite from the direction of current flow from transistor 14 under the first set of conditions. This use of the bidirectional properties of transistor 14 makes it possible substantially to reduce the number of transistors required for the logic circuit as it permits a single transistor to perform the function which would otherwise have required a number of transistors in separate current paths.

The circuit of FIGURE 2 performs a logic function which is complementary to that performed by the circuit of FIGURE 1. The Boolean equations below completely describe these complementary logic functions.

$$x=\bar{a}+\overline{be}+\overline{bdc} \quad (21)$$

$$y=\bar{c}+\overline{de}+\overline{bda} \quad (22)$$

In the operation of the circuit of FIGURE 2, the input condition $a.e.c.\bar{b}.\bar{d}.=1$ is prohibited. The operation of the circuit readily can be understood from the equations and from the explanation of the operation of the circuit of FIGURES 1 and 3 which has already been given.

Another circuit according to the invention is shown in FIGURE 4. This circuit is also a bridge network and it includes 5 transistors 41–45 of P-type and 5 transistors 46–50 of N-type. Terminal 52 of the network is connected to a source of operating voltage +V and terminal 54 of the network is connected to a source of reference voltage, shown as ground. Terminal 56 of the network is an output terminal at which the output $x$ is available.

The circuit of FIGURE 4, like the other circuits, has the advantageous feature that a transistor is so-connected that it can conduct current in either direction. In the case of FIGURE 4, the transistors 45 and 50 operate in this way. For example, when the transistors 41 and 44 are made to exhibit a low impedance, current flows in one direction through transistor 45 and when the transistors 43 and 42 are made to exhibit a low impedance, current flows in the opposite direction through transistor 45.

The operation of the circuit of FIGURE 4 is defined by the following Boolean equation $$x=\overline{ac+\bar{b}d+e(ad+\bar{b}c)} \quad (23)$$

To illustrate how the equation is derived, a number of specific examples are given. Assume that $a$ and $c$ are both 1. In this case, transistors 42 and 44 isolate the $x$ terminal from +V and transistors 46 and 47 provide a low impedance path from terminal 56 to ground, making $x=0$. As a second example, when $b=d=1$ transistors 48 and 49 act as low impedance paths and connect terminal 56 to ground; transistors 43 and 41 act as high impedances and isolate terminal 56 from the operating voltage terminal 52. Therefore, $x=0$. As a third example, when $ebc=0$ and $da=1$, $x=1$ and transistor 45 conducts in one direction. On the other hand, when $eda=0$ and $bc=1$, $x=1$ and transistor 45 conducts in the opposite direction. Similar analyses may be made of the other circuit conditions expressed in the equation.

I claim:

1. In a field-effect transistor bridge network which includes a plurality of arms extending from the first terminal to third and fourth terminals, respectively, and a plurality of arms extending from a second terminal to said third and fourth terminals, respectively, in combination:

a source of operating voltage connected to the first said terminal;

a source of reference voltage connected to the second said terminal;

the source-to-drain path of at least one field-effect transistor in each said arm, each said path conducting current in a single direction in response to an enabling signal applied to the gate electrode of the field-effect transistor in said path; and another arm of said bridge network extending between said third and fourth terminals, said arm comprising the source-to-drain path of a field-effect transistor which conducts in response to an enabling voltage applied to the gate electrode thereof in a direction dependent upon the conducting states of the other transistors.

2. In a field-effect transistor bridge network as set forth in claim 1, some of said field-effect transistors being of one conductivity type and some of opposite conductivity type.

3. In a field-effect transistor bridge network as set forth in claim 1, each arm of the bridge network comprising the source-to-drain path of a single transistor.

4. In a field-effect transistor bridge network, in combination:

first and second arms extending from a first terminal to third and fourth terminals, respectively, each said arm comprising the source-to-drain paths, connected essentially in series, of two field-effect transistors of given conductivity type;

third and fourth arms extending from a second terminal to said third and fourth terminals, respectively, each said arm comprising the source-to-drain path of a field-effect transistor of opposite conductivity type to the transistors in the first pair of arms; and a fifth arm connected between a point on the first arm between its two transistors and a corresponding point on the second arm comprising the source-to-drain path of a field-effect transistor of said given conductivity type.

5. The circuit set forth in claim 4, further including:

a source of operating voltage connected across said first and second terminals.

6. The circuit set forth in claim 5, further including:

a sixth arm extending between the third and fourth terminals comprising the source-to-drain paths, essentially connected in series, of two field-effect transistors of said opposite conductivity type; and a seventh arm connected between said second terminal and a point on the sixth arm between its two transistors comprising the source-to-drain path of a field-effect transistor of said opposite conductivity type.

7. In a field-effect transistor bridge network, in combination:

first and second arms extending from a first terminal to third and fourth terminals, respectively, each comprising the source-to-drain path of a field-effect transistor of given conductivity type;

third and fourth arms extending from a second terminal to third and fourth terminals, respectively, each comprising the source-to-drain path of a field-effect transistor of said given conductivity type; and a fifth arm extending from the third to the fourth terminal comprising the source-to-drain path of a field-effect transistor of said given conductivity type.

8. The circuit set forth in claim 7 and further including:

a circuit of the same configuration as claimed in claim 7 but whose transistors are of opposite conductivity type to the transistors of the circuit of claim 7, connected at its first terminal to the second terminal of the circuit of claim 7 and connected at its second terminal to a point of reference voltage; and a source of operating voltage connected to the first terminal of the circuit of claim 7.

References Cited

UNITED STATES PATENTS

| | | | |
|---|---|---|---|
| 3,134,912 | 5/1964 | Evans | 307—303 X |
| 3,252,011 | 5/1966 | Zuk | 307—205 |

DONALD D. FORRER, *Primary Examiner.*

U.S. Cl. X.R.

307—238, 251, 279